No. 732,083. PATENTED JUNE 30, 1903.
A. T. JONES.
PROCESS OF CANNING FOODS.
APPLICATION FILED OCT. 22, 1900.
NO MODEL. 2 SHEETS—SHEET 1.
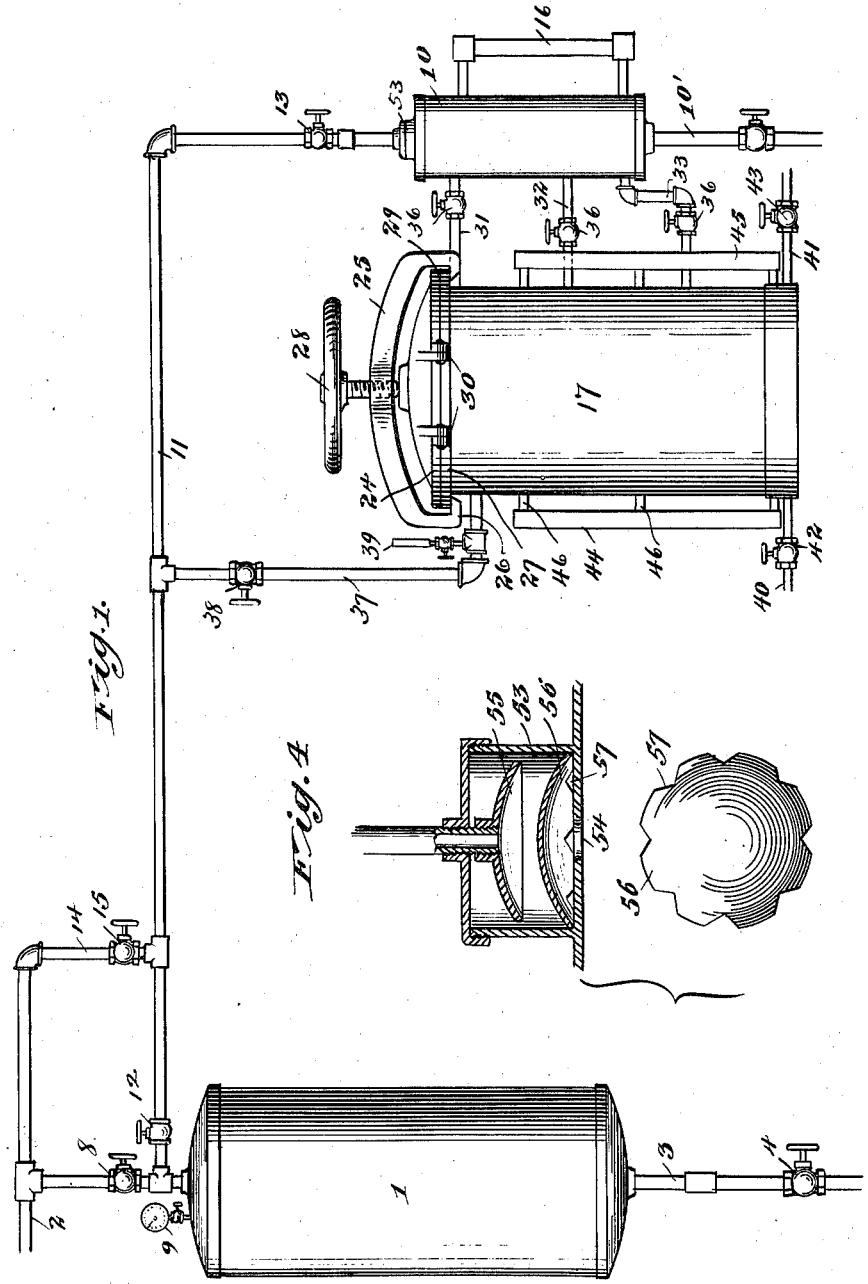
Witnesses,
Inventor,
Amanda T. Jones,
By Offield Towle & Linthicum
Att'ys.

No. 732,083. PATENTED JUNE 30, 1903.
A. T. JONES.
PROCESS OF CANNING FOODS.
APPLICATION FILED OCT. 22, 1900.
NO MODEL. 2 SHEETS—SHEET 2.
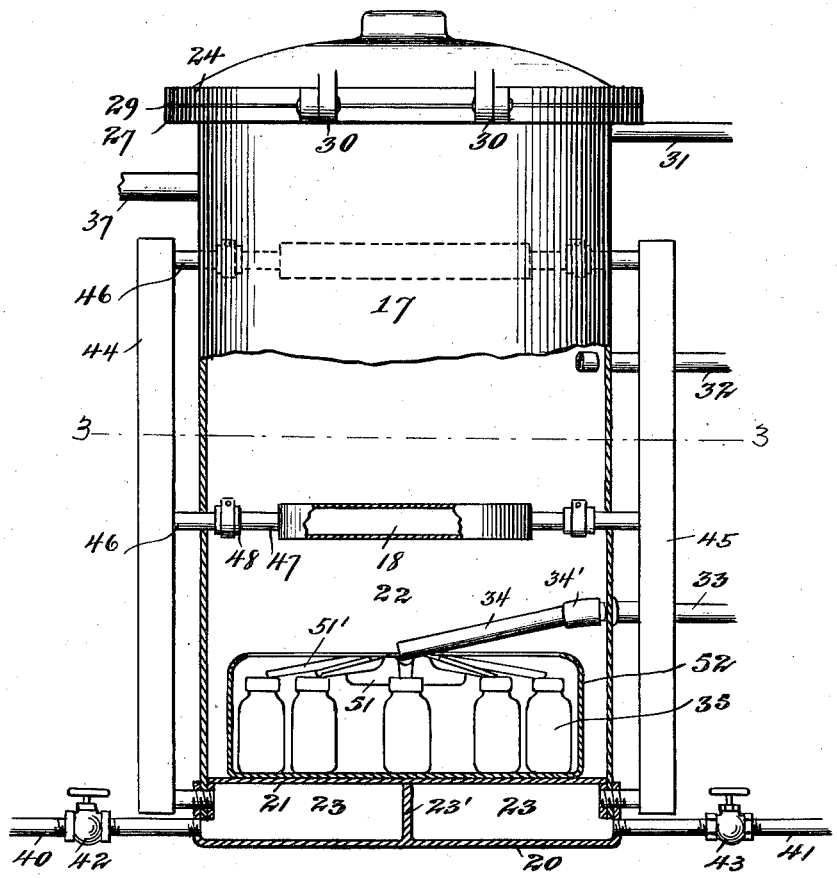
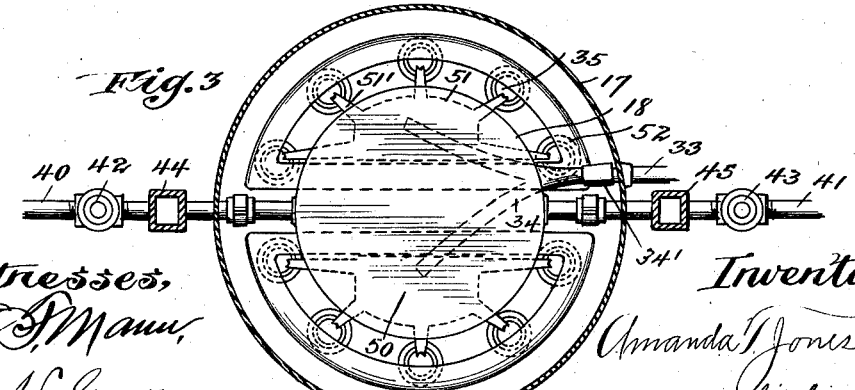

No. 732,083. Patented June 30, 1903.

UNITED STATES PATENT OFFICE.

AMANDA T. JONES, OF JUNCTION CITY, KANSAS.

PROCESS OF CANNING FOODS.

SPECIFICATION forming part of Letters Patent No. 732,083, dated June 30, 1903.

Application filed October 22, 1900. Serial No. 33,915. (No model.)

*To all whom it may concern:*

Be it known that I, AMANDA T. JONES, of Junction City, county of Geary, and State of Kansas, have invented certain new and useful Improvements in Processes of Canning Foods, of which the following is a specification.

This invention relates to an improved process for preparing food products, and refers more specifically to an improved method and means for treating and sterilizing such food products either for future or immediate use.

Among the salient objects of the invention are to provide an improved process of preparing food products whereby they are made ready for use and preservation by being subjected to treatment *in vacuo*, to provide a process whereby the product is sterilized and rendered capable of keeping indefinitely without cooking, and to provide a process the several steps of which may be conveniently carried out and the sealing of the product effected without elaborate appliances.

The invention consists in the matters hereinafter described, and more particularly pointed out in the appended claims, and will be readily understood from the following description, reference being had to the accompanying drawings, forming a part of said description.

It is to be understood that my improved process is adapted for use in preparing various kinds of food products, both of the animal and vegetable kingdoms, the end sought in carrying out the process being to first devitalize or expel all gases and germs which would tend to spoil the product being treated and to then seal or inclose the product hermetically in such manner as to prevent the access of germs, thereby preparing the food so that it may be preserved indefinitely.

While the invention is described with reference to its application to food products, it is not to be thereby understood that it is limited to such products; but it may, on the contrary, be found well adapted to the preservation of other materials.

In carrying out my improved process I first inclose the product to be treated in a hermetical inclosure and then proceed to expel the air, so as to produce a relatively perfect vacuum, such as would be indicated by approximately twenty-nine inches on the vacuum-gage. Preferably and in the practical carrying out of my process I produce this vacuum by charging a closed vessel, which may be thrown into communication with a second closed vessel containing the food product, with steam, then condensing the steam therein, and thereafter opening the communication between the two vessels, so as to partially exhaust the vessel containing the food product, and repeating this operation until I secure a vacuum of the required degree. Having thus secured the required vacuum, I subject the food products to a change of temperature for the purpose of still further expelling any air or deleterious gases which may still be retained in the body of the product being treated. In the case of most products— such as fruits, vegetables, and the like—the change of temperature referred to consists in warming the product to such a degree as will bring about ebullition. This temperature, it will be understood, however, is not nearly so high as the temperature required to cause boiling under atmospheric pressure and is a temperature less than that under which coagulation of albumen takes place—namely, about 140° Fahrenheit. The product is subjected to this boiling process or step for a considerable period of time, so that the air and deleterious gases are effectually expelled. In the case of certain products, notably those products containing more or less viscous fluids, from which it is difficult to extract the air and other gases or products susceptible to rapid deterioration, I find it desirable to first subject the product to a low temperature extending over a considerable period of time. The low temperature arrests and prevents the development of germs or chemical change until the vacuum has had time to cause the expulsion or extraction of the air and gases. After the termination of this period of low temperature the heat is applied so as to rapidly raise the product to the point at which the boiling takes place and maintained until the gases have been expelled, as first described. Obviously such products as readily give up the contained air and gases do not require the extended cooling treatment, and it will be further obvious that if the process be carried on in a surrounding temperature sufficiently low the special cooling step will be superfluous. Having thus treated the product, I next submerge the same while still within the vacuum-chamber in a suitable fluid adapted to prevent the access of air and germs, preferably in the case of fruits and vegetables, either in their own juices or in water. The product having been thus submerged or covered with liquid, so as to exclude the air, the vacuum-chamber is open and the closures applied to the receptacles within which the product is contained, care being taken to effect the sealing while the open part of the receptacle is still submerged in liquid. The sealing up of the product while submerged completes the process as ordinarily carried out.

It will be understood from the foregoing description that it is of the utmost importance that an apparatus be employed in carrying out the process which is capable of producing and maintaining a very perfect vacuum, which may be charged with steam and which is therefore capable of withstanding considerable internal as well as external pressure, that it be so constructed and arranged that the juice or fluid with which the product is submerged while *in vacuo* may be flowed over and caused to submerge the product without destroying the vacuum, that suitable means be provided for supplying the requisite heat to the product, and inasmuch as a vacuum forms an almost perfect insulation against heat that the apparatus be so constructed that the heat may be transmitted by direct conduction through a metallic or analogous medium, and that the apparatus throughout be so constructed and arranged as to be capable of being controlled to regulate the temperature, pressure, &c., at will.

In order to carry out the process, I have invented an apparatus which is made the subject of a separate application filed of even date herewith and which I will now describe with reference to the accompanying drawings, wherein—

Figure 1 is an elevation of a type of apparatus particularly adapted for carrying out the process on a relatively large scale. Fig. 2 is an enlarged detail, in axial sectional view, of that one of the receptacles shown in the apparatus in Fig. 1 which I designate the "keeper." Fig. 3 is a horizontal sectional view taken on line 3 3 of Fig. 2. Fig. 4 is an axial sectional view of a check-valve forming one feature of the apparatus.

Referring first to Fig. 1, 1 designates as a whole a closed vessel, which for convenience of description I will hereinafter term an "exhauster," which is adapted to be charged with steam from any suitable source—as, for example, through an inlet-pipe 2, communicating with any suitable steam-boiler. The exhauster is provided with an outlet-pipe 3, controlled by a suitable valve 4. The inlet-pipe 2 is also controlled by a valve 8, and the exhauster is provided with a suitable vacuum-gage 9, whereby the degree of rarefication or vacuum within the exhauster will be indicated. 10 designates as a whole a second closed receptacle, which for convenience of description I will hereinafter designate the "feeder," which is arranged to communicate with the exhauster through a pipe 11, said pipe being shown as conveniently arranged to form a branch of the inlet-pipe 2 of the exhauster and being provided with valves 12 13, whereby communication with the exhauster or feeder may be controlled at will. The inlet-pipe 2 is provided with a by-pass pipe or portion 14, controlled by a valve 15, whereby steam may be admitted to the feeder while excluded from the exhauster or, vice versa, admitted to the exhauster while excluded from the feeder. The feeder is adapted to contain fluid which is added to the product, and it is therefore provided with a sight-gage 16, whereby the amount of fluid contained therein may be determined by inspection. 17 designates as a whole a third closed receptacle, which for convenience of description I will herein designate the "keeper" and which is adapted to contain the product undergoing treatment, said vessel being shown in the present instance as consisting of an upright cylinder provided in its interior with a plurality of hollow shelves 18, arranged at different heights and pivotally supported upon pipe connections extending in through the side walls of the keeper at diametrically opposite points and constituting parts of a circulating system, whereby a heating medium may be passed through said hollow shelves in the manner and for the purpose hereinafter more fully described. The lower end of the keeper is permanently closed by means of an end wall 20 and at a short distance above said end wall is arranged a partition or diaphragm 21, completely separating the upper from the lower portion of the receptacle and forming upper and lower chambers 22 23, respectively. The chamber 23 is preferably subdivided, as indicated at 23'. The upper end of the keeper is formed by means of a removable closure or end wall 24, held in position so as to hermetically close the vessel and to withstand both internal and external pressure by means of a clamping-yoke 25, having its inturned ends 26 engaged with an overhanging flange 27 and supporting a hand-screw 28, threaded through its center and acting upon the outer surface of the inclosure, as indicated clearly in the drawings. In order to insure a perfectly-tight joint between the end margins of the keeper and the removable end wall 24, a packing-ring or washer 29 is interposed between said parts, and for convenience of manipulation the end wall is hinged to the body of the vessel, as indicated at 30. 31, 32, and 33 designate a series of pipes affording communication between the feeder and the keeper, these several pipes being arranged at different heights, so as to severally discharge at points above the several series of product-receptacles 35, supported upon the several shelves 18 of the keeper. Each of the pipes 31 32 33 is provided with a controlling-valve 36, and the end portions of said pipes which project within the keeper are made detachable by means of slip-joints, so that they may be removed in order to introduce and remove the product-receptacles conveniently. In addition to the liquid-pipes 31 to 33 a pipe 37 is arranged to form communication between the upper end of the keeper and the pipe 11, this pipe being provided with a controlling-valve 38 and, desirably, with a thermometer 39, whereby the temperature within the keeper is indicated, it being understood that that portion of the pipe 37 with which the thermometer connects is in open communication with the interior of the keeper. The lower chamber 23 of the keeper, which for convenience I will hereinafter designate the "heating" and "cooling" chamber, is provided with an inlet-pipe 40, through which either water or steam may be admitted to cool or heat said chamber, as may be required, and with an outlet-pipe 41, both the inlet-pipe 40 and the outlet-pipe 41 being provided with suitable controlling-valves, as 42 43, respectively.

Describing now more particularly the circulating-pipe connections whereby water or other heating or cooling medium may be circulated through the hollow shelves 18, hereinbefore referred to, 44 45 designate risers communicating at their lower ends with the opposite sides of the lower chamber 23 and extending thence upwardly adjacent to the outer wall of the keeper and each provided at points opposite the several shelves with inleading branches 46, which extend through the side walls of the keeper and are connected with corresponding nipples 47, formed upon the hollow shelves by means of suitable unions 48, the joints thus formed being suitably packed to prevent leakage and being also so constructed and assembled that the shelves may be tilted upon their pivotal axes thus formed into vertical position. The shelves are held in horizontal position by means of frictional engagement with their supports or pipe connections. The object of so mounting the hollow shelves 18 as to permit them to be moved into vertical position is to enable the receptacles containing the food products to be inserted and removed without removing the shelves.

50 designates a plurality of distributing-receptacles, for convenience of description hereinafter termed "distributers," two for each shelf, said distributers being provided with a plurality of open troughs or channels 51', severally leading to the respective receptacles constituting each set, and with a main channel 51, which is adapted to be brought into register with the inlet end of its respective supply-pipe leading in from the feeder.

In order that the cans or other receptacles which contain the food product undergoing treatment may be submerged, as hereinafter described, each set of receptacles resting upon an individual shelf is inclosed in an outer surrounding receptacle or pan 52, which is provided with side walls rising some distance above the tops of the food-receptacles, so that the inclosing receptacle or pan may be filled with liquid, so as to completely submerge the food-receptacles. Preferably, also, to facilitate the insertion and removal of food products the pan-shaped receptacles will be made semicircular and arranged in pairs upon each shelf.

It becomes necessary from time to time to admit liquid to the feeder through the pipe 10' thereof, and it will be understood that if the liquid be thus admitted the partial vacuum obtaining within the system will cause the liquid to rise and tend to flow out through the communicating pipe 11 toward the exhauster. This tendency exists, however, only during the admission of the liquid and ceases as soon as the inlet-pipe is closed. In order to prevent the liquid from thus escaping from the feeder, I provide a check-valve in the upper end thereof arranged to control the communicating pipe 11, said check-valve comprising a cylindric valve-chamber 53, forming an extension of the upper end of the feeder and communicating with the latter through a port 54, the pipe 11 being arranged to communicate with the upper or opposite side of said chamber, as best indicated in Fig. 4. Upon the end of said pipe 11, which projects slightly within the top wall of the valve-chamber, is mounted a fixed cup-shaped disk 55, apertured at its center to register with the aperture of the supporting-pipe, and below said disk 55 is loosely arranged a similarly-shaped concavo-convex disk 56, imperforate at its center and adapted to fit within the fixed disk, so as to seal the end of the pipe 11 when raised by the upward rush of the fluid. The disk 56 is confined in position by means of the cylindric side walls of the valve-chamber, which hold it against lateral displacement, while permitting it to rise and fall a short distance, and in order to afford suitable passages for air or vapor past said valve-disk when in its lower or open position it is provided at its periphery with a plurality of notches or apertures 57.

In carrying out my improved process by the use of the apparatus thus far described I proceed as follows: Having arranged the several receptacles containing the product to be treated within the keeper upon the several shelves, closed the keeper securely, and supplied the feeder with the fluid with which it is proposed to submerge the product-receptacles before sealing the latter, communication between the exhauster and the feeder and keeper is shut off by closing the controlling-valves 13 and 38 and steam admitted to the exhauster through pipe 11 to fill the latter. All of the communicating pipes of the exhauster are now closed, and the exhauster is drenched with cold water to condense the steam therein, thus creating a substantially perfect vacuum, after which the valves 13, controlling the inlet to the feeder, and valve 38, controlling inlet to the keeper, are opened, as well, also, as the valve 12, thus permitting the exhausting action of the exhauster to partially exhaust the remainder of the apparatus. As soon as the pressure has become equalized between the several receptacles I again shut off communication between the exhauster and feeder and keeper, open the valves to readmit steam to the exhauster, as before, then shut off the steam and condense, as in the first instance, and again open communication between the exhauster and other receptacles. I repeat these several steps until the vacuum-gage of the exhauster indicates that a comparatively perfect vacuum obtains throughout the system. After the requisite vacuum has been obtained, assuming that the product to be treated is of a character which readily gives up the air and gases contained therein, I apply heat to bring about the boiling by passing either water or steam through the lower chamber 23 of the keeper and through the hollow supports or shelves upon which the food product is supported, which communicate with said chamber 23 through the risers, as hereinbefore described. It will be obvious that by reason of the arrangement of the communicating pipes and risers whatever heating medium is admitted to the lower chamber will rise and circulate through the hollow supports, so that the food-receptacles resting therein will be warmed uniformly, the heating medium—as, for example, warm water—being permitted to flow out through the discharge-pipe 41 of the keeper after having circulated therethrough. A very moderate degree of heat suffices to raise the food product to a boiling temperature *in vacuo*, this temperature being always less than 140° Fahrenheit, and the boiling acts to effectually liberate and discharge any air or gas which may have been retained within the product up to this stage of the process. After the boiling has been continued for a sufficient period of time to insure the complete discharge of the air and gases I then open the valve controlling the communicating pipe 31, extending between the feeder and the keeper and supplying the uppermost distributer, and permit the liquid to flow into the keeper until the gage 16 indicates that sufficient liquid has been admitted to fill the food-receptacles and the receptacle or basket within which the latter are inclosed so as to completely submerge the food-receptacles. It is obvious that previous to the warming of the food materials if any valve between feeder and keeper be opened the fluid contained in the former and which has been resting *in vacuo* subject to a gradual elimination of its contained air will flow downward by hydrostatic pressure of the stress of gravity and supply the food-receptacles with the amount required at this stage of the process; but after the warming of the materials *in vacuo*, they being partially submerged and with their surrounding fluid in a state of ebullition, the vacuum-space, therefore practically pressureless, will become faintly saturated with the ascending vapors, which will be drawn toward the exhauster, (the latter being open thereto,) but will not drift toward the feeder. In this case the vacuum within the feeder will remain undeteriorated and the fluid therein will refuse to flow downward, being withheld by the slightest accumulated pressure of vapor within the keeper. In order to secure the downward flow of the fluid as desired and completely fill and submerge the food-receptacles, as described, the valve communicating with the exhauster is closed, leaving feeder and exhauster in full communication as to their vacuum-spaces. It is necessary to allow several minutes for the equalization of conditions between the two, the feeder in the meantime acting in place of the exhauster and drawing vapor from the keeper, after which the operation of the law of hydrostatic pressure or gravity, which has been in suspense, will again become operative and the fluid flow again freely and abundantly. In this connection it is to be noted that the liquid from the feeder is permitted to flow in through the pipe 31 and distributer connected therewith slowly, and in thus trickling through the open passages exposed to the vacuum the liquid itself all becomes very thoroughly exhausted of any air or gases which may remain therein. Having thus filled the uppermost series of receptacles, I close the valve of the pipe 31 and proceed in precisely the same manner with the next succeding lower set of receptacles, and so on until all of the product-receptacles have been flooded or submerged. The keeper is now opened by removing its upper end closure and the several series of receptacles lifted out carefully, so as to not expose the mouths of the submerged product-receptacles, and the stoppers or other sealing devices applied while the receptacle still remains submerged. In this way I absolutely prevent access of air and contaminating germs to the treated product, and when properly sealed the product will remain in a state of perfect preservation indefinitely.

In carrying out the process of preparing products which are of a more or less viscous character or are otherwise of such character as to retard the discharge of the air and the gases therefrom under vacuum-pressure or in treating such food products as from their nature are liable to rapid deterioration I proceed as before until the required vacuum has been obtained in the apparatus, and then instead of immediately applying heat I first circulate through the hollow supports of the keeper a cooling medium, such as cold water, thereby reducing the temperature to a point sufficiently low to prevent the development of germs, and I retain this low temperature long enough to permit the vacuum-pressure to act effectively in drawing out or extracting the air and gases. After this has been accomplished I apply the heat rapidly and conclude the process as before.

It will be understood, of course, that the process is also applicable to the treatment of products which are either fluid or semifluid in their nature, and in carrying out the process under such condition the several steps will be substantially the same as hereinbefore described, except that instead of placing the product in the receptacles within the keeper in the first instance the product will be first placed in the feeder and fed from the latter into the receptacles within the keeper in precisely the same manner as is the liquid in the case of solid or semisolid products. It is to be noted in this connection that the vacuum obtaining within the apparatus exerts a strong evaporative effect upon the product, and by so regulating the flow of liquid or liquid product from the feeder to the keeper that the transfer takes place slowly I may evaporate and therefore condense to any reasonable extent found desirable, it being understood that the heat supplied in the meantime aids materially in producing this effect.

It may also be explained that my improved process is adapted for preparing for keeping certain food products which do not require to be hermetically sealed after they have been treated. For example, certain meat products may be subjected to the vacuum treatment constituting the first part of the process, and the liquid which is added to such products during the latter part of the process may be of a character which will in itself impregnate and sufficiently effect the curing of the product to cause it to keep indefinitely without being hermetically sealed.

I claim as my invention—

1. The improvement in the art of preparing food products which consists in first subjecting said products to the action of a vacuum within a hermetical inclosure, next changing the temperature of said products while *in vacuo*, then submerging the food products in liquid while still *in vacuo* and finally sealing beneath the submerging medium.

2. The improvement in the art of preparing food products which consists in first subjecting said products to the action of a vacuum within a hermetical inclosure, next raising the temperature of said products to bring about boiling *in vacuo*, at a temperature below cooking, next submerging the food products in liquid while *in vacuo* and finally removing from the vacuum and sealing beneath the submerging medium.

3. The improvement in the art of preparing food products which consists in first subjecting said products to the action of a vacuum within a hermetical inclosure and at a relatively low temparature, next raising the temperature of the food products, and boiling *in vacuo*, then submerging the food products in liquid while *in vacuo* and finally removing from the vacuum and sealing beneath the submerging medium.

4. The improvement in the art of preparing food products, which consists in subjecting said products and a separately-contained auxiliary liquid to the action of a vacuum within a hermetical inclosure, next raising the temperature of the product and boiling *in vacuo*, then flowing the liquid over the product to submerge the latter while *in vacuo* and finally removing from the vacuum and sealing beneath the submerging medium.

AMANDA T. JONES.

Witnesses:
 ALBERT H. GRAVES,
 FREDERICK C. GOODWIN.